United States Patent [19]

Kakino et al.

[11] Patent Number: 5,117,169
[45] Date of Patent: May 26, 1992

[54] NUMERICAL CONTROL DEVICE FOR A MACHINE TOOL

[75] Inventors: Yoshiaki Kakino, 256-5, Iwakura-Hanazono-cho, Sakyo-ku, Kyoto 606; Shigeaki Tokumo, Asaguchi; Tetsuo Nakamura, Kawasaki; Torao Takeshita, Nagoya, all of Japan

[73] Assignees: Yoshiaki Kakino, Kyoto; Yasuda Kogyo Kabushiki Kaisha, Okayama; Mitutoyo Corporation; Mitsubishi Denki Kabushiki Kaisha, both of Tokyo, all of Japan

[21] Appl. No.: 622,048

[22] Filed: Dec. 4, 1990

[30] Foreign Application Priority Data

Dec. 5, 1989 [JP] Japan ................................. 1-316241

[51] Int. Cl.$^5$ .............................................. G05B 19/42
[52] U.S. Cl. ..................................... 318/578; 318/570; 318/571; 318/573; 364/474.03
[58] Field of Search .......................... 318/560-636; 364/513, 474.01-474.33, 180-183

[56] References Cited

U.S. PATENT DOCUMENTS

| | | |
|---|---|---|
| 3,250,012 | 5/1966 | Hilton et al. .......................... 33/174 |
| 3,668,653 | 6/1972 | Fair et al. . |
| 3,783,253 | 1/1974 | Anderson et al. ............... 318/570 X |
| 4,131,837 | 12/1978 | Whetham ............................ 318/571 |
| 4,356,552 | 10/1982 | Imazeki et al. ..................... 318/571 |
| 4,412,295 | 10/1983 | Imazaki et al. ..................... 318/571 X |
| 4,414,495 | 11/1983 | Sumi et al. .......................... 318/571 |
| 4,502,108 | 2/1985 | Nozawa et al. ................. 318/630 X |
| 4,754,404 | 6/1988 | Inoue ..................................... 364/475 |
| 4,789,931 | 12/1988 | Kuraguno et al. ............. 318/572 X |
| 4,881,021 | 11/1989 | Hirai ..................................... 318/569 |
| 4,902,951 | 2/1990 | Ohta et al. .......................... 318/632 |
| 4,967,127 | 10/1990 | Ishiguro et al. ..................... 318/571 |
| 4,980,627 | 12/1990 | Joboji et al. ......................... 318/570 |
| 4,983,899 | 1/1991 | Komatsu et al. ................... 318/571 |
| 4,992,711 | 2/1991 | Sugita et al. ........................ 318/561 |
| 5,019,763 | 5/1991 | Komatsu ............................. 318/571 |

OTHER PUBLICATIONS

Lazzaretti, *Pioneering in Technology... Building for the Future*, "Computer Aided Inspection System", 17th Numberical Control Society Annual Meeting and Technical Conference, May 1982.

Primary Examiner—Paul Ip
Attorney, Agent, or Firm—Rothwell, Figg, Ernst & Kurz

[57] ABSTRACT

A numerical control (NC) device 10 for a machine tool 1 provided with a measurement probe 2b effects measurements of a work 4 on the machine table 5 after a working process. A measurement program, generated by the NC device by modifying a working program, controls the relative movement of the probe 2b with respect to the workpiece 4 such that the probe 2b moves along the contour of the worked portion of the workpiece 4 with a displacement from the neutral position thereof, wherein the displacement of the probe is sampled at a predetermined sampling period. A working error calculation program 17 calculates the working error from the sampled displacements. If the working error is judged correctable, a outside tolerance range and correction re-working is effected so as to reduce the working error. The measurement/re-working cycles are repeated until the working error is within tolerance.

3 Claims, 5 Drawing Sheets

NUMERICAL CONTROL DEVICE FOR A MACHINE TOOL

BACKGROUND OF THE INVENTION

This invention relates to numerical control devices (referred to hereinafter as NC devices) for machine tools, by which high precision working e.g., cutting, grinding, abrasive working, of a workpiece may be effected with enhanced quality assurance and working efficiency.

Conventionally, the quality assurance of the form precision, dimension precision, roughness of the finished surfaces, etc., of the works which have undergone cutting, grinding, or abrasive working, has been effected, except for certain exceptional cases, by means of an independent measurement apparatus (e.g., circularity, three-dimension, or roughness measurement apparatus) separate from the machine tool. Thus, in order to accomplish quality assurance for the form precision, dimension precision, roughness of the finished surface, etc., of the work that have undergone cutting, grinding, or abrasive working, the workpiece is first removed from the machine tool and is positioned on an independent measurement apparatus separate from the machine tool, where the measurements of the work are effected. If the measurement data of the work is not within the predetermined tolerances and the work is capable of correctional re-working, the work is again positioned on the machine tool, such that a correction re-working based on the measurement data is effected on the work.

After the re-working, the workpiece is again brought on the measurement apparatus for necessary measurements. The measurement/re-working cycles are repeated until the predetermined precision is obtained.

The reason that measurement apparatus separate from the machine tools are necessary for the quality assurance of the workpiece is as follows. In addition to the fact that the movement precision of the machine tools has hitherto been low compared with the precision needed for the measurements, the vibrations and the thermal deformations present in the machine tools further reduce the precision to make precise measurements impractical. Thus, except for one-dimensional measurements, such as the measurements of the diameter of bearings, which are not affected by the mechanical movements precision of the machine tool, only the measurements of the reference positions or interior diameters utilizing touch probes have been effected, at, however, a low precision.

Thus, according to the conventional measurement method, the quality assurance can be effected only with respect to whether the working error of the work is within the predetermined tolerance. If the work is outside of the tolerance, a skilled operator must take measures therefor with try-and-error method based on his past experiences, and remeasurements are effected after a correctional re-working. (The precisions for one-dimensional lengths are exceptions for this.)

Further, even if the magnitudes of errors are known by means of some ingenuity, the work must be transferred and re-alligned on the machine tool since the measurement apparatus and the machine tool are separate from each other. The re-allignment, however, becomes the more difficult as the required precision increases, such that an extreme skill and a long time are needed therefor.

As described above, the conventional NC machine tools and measurement apparatus are intrinsically incapable of effecting corrections for the working errors for attaining quallity assurance.

SUMMARY OF THE INVENTION

It is therefore an object of this invention to provide an NC device for a machine tool with an enhanced movement precision, by which the measurements of the work necessary for the quality assurance can be effected on the machine tool itself, such that, if unallowable working errors are present, appropriate correctional workings are effected so as to prevent productions of defective articles, and that, since the measurements are effected on the machine tool, the transfer and the alignment of the work become unnecessary, and the efficiency of the working is enhanced.

The above objects are accomplished in accordance with the principle of this invention by a numerical control device for a machine tool, which comprises: measurement programming means for generating a measurement program for controlling a measurement procedure of the measurement means of the machine tool; working error calculation means, connected to an output of said measurement means, for determining a working error of form and dimension as measured by said measurement means with respect to a target form and dimension as commanded by said numerical control device, said working error calculation means judging whether said working error is within an allowable range or not, and further, when the working error is outside of the allowable range, whether the working error is such that a correction re-working of the work is possible or not; and correction re-working programming means for generating a correction re-working program when said working error calculation means judges that the working error is outside of the allowable range and a correction re-working of the work is possible, said correction re-working programming means controlling the working means of the machine tool in a re-working procedure by which the form and dimension of the work is corrected to the target form and dimension.

The features which are believed to be characteristic of this invention are set forth with particularity in the appended claims. This invention itself, however, both as to its organization and method of operation, together with further objects and advantages thereof, may best be understood from the following detailed description.

DETAILED DESCRIPTION OF THE PREFERRED EMBODIMENT

Referring now to the accompanying drawings, an embodiment of this invention is described.

Figure 1:
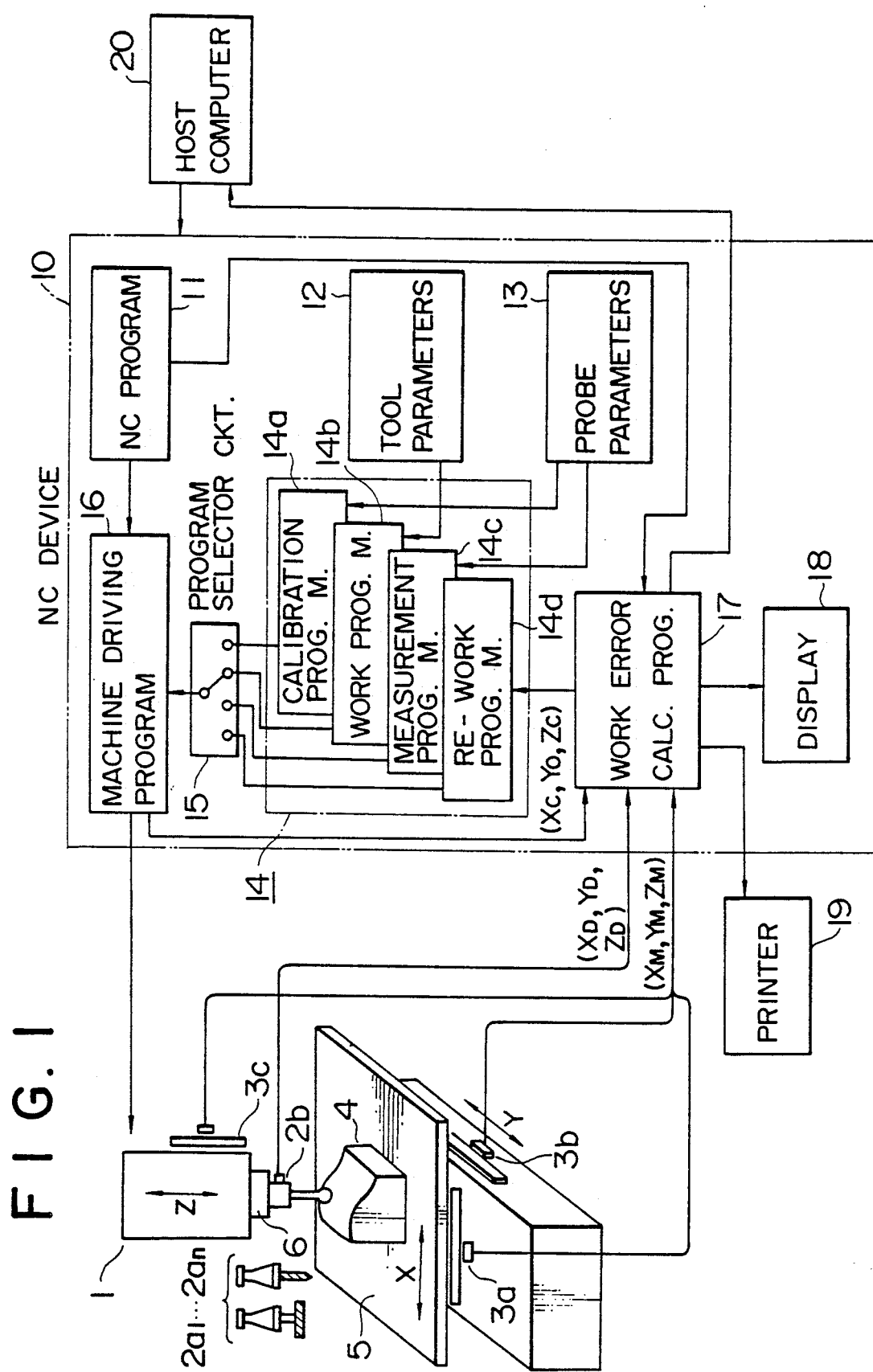
FIG. 1 is a block diagram showing the overall organization of the numerical control device for a machine tool according to this invention.

FIG. 1 shows the overall organization of an embodiment of this invention. A machine tool 1 of high operating precision controlled by an NC (numerical control) device 10 is provided with an automatic tool changer (referred to as ATC hereinafter, not shown in the figure) for automatically changing the machining tools $2a1$, $2a2$, - $2an$, and three-dimensional probes $2b$ for on-machine measurements. The tools and probes can also be changed manually. Final terminal position detectors $3a$, $3b$, and $3c$, consisting of linear scales (linear encoders) or inductosyns, detect the positions of the driven portion of the machine tool 1 with respect to the three mutually orthogonal X-, Y-, and Z-axes. A workpiece 4 is supported on a machine table 5. The tool $2a1$ through $2an$ or the three-dimensional probe $2b$ is attached to a spindle 6.

The NC (numerical control) device 10 consists for the most part of software or programs. Next, the organization thereof is described with regard to each functional block. A NC program 11 comprises procedures for determining the finished form and working (machining) conditions, calibrating the three-dimensional probe, and working, measuring, and re-working the workpiece. Tool parameters 12 are for making adjustments for the tool length or tool diameter of the tool $2a1$ through $2an$ utilized in the working process. Probe parameters 13 are for making adjustments for the head length, head diameter, and the feeding speed of the three-dimensional probe $2b$. The instructions to the NC program 11, the tool parameters 12, and the probe parameters 13 are inputted from an exterior programming device (not shown) or an operation board (not shown). A driving mode indicating means 14 for indicating the driving mode of the machine tool 1 comprises: a calibration programming means $14a$, utilized for calibrating the three-dimensional probe $2b$, and referencing the probe parameters 13; working programming means $14b$, utilized for working the workpiece 4, and referencing the tool parameters 12; measurement programming means $14c$, utilized for making measurements of the workpiece 4, and referencing the probe parameters 13; and re-working programming means $14d$, utilized for correction re-working after the measurements, and referencing the data in the working error calculation program 17 described hereinbelow. These parts of the driving mode indicating means 14 adjust portions of the NC program 11 corresponding thereto respectively. A program selector circuit 15 selects the necessary driving mode of the machine tool 1 from the driving mode indicating means 14. A machine driving program 16 adjusts the NC program 11 in accordance with the driving mode selected by the program selector circuit 15, and controls the machine tool 1 accordingly. Working error calculation program 17 receives and stores, at the same sampling timings and at a predetermined sampling period, the output signals $(X_M, Y_M, Z_M)$ of the final terminal position detectors $3a$ through $3c$, and the deviations or displacements $(X_D, Y_D, Z_D)$ outputted from the three-dimensional probe $2b$. In addition, the working error calculation program 17 calculates the form and dimensions of the work 4, taking into consideration the radius of the probe sphere of the probe $2b$, and obtains the error thereof with respect to the coordinate instruction values $(X_C, Y_C, Z_C)$ outputted from the machine driving program 16.

A display 18 comprises, for example, a CRT (cathode ray tube) provided within the NC device 10, and displays the result of the procedures of the working error calculation program 17 in the form of characters and graphic figures. Further, a printer 19 connected to the NC device 10 prints out the result of the procedures of the working error calculation program 17.

When the NC control is effected by means of a host computer 20, the error information of the working error calculation program 17 is up-loaded to the host computer 20, where judgment is made with regard to whether the correction of the error is practicable. If corrections are necessary, a correction re-working NC program is generated in the host computer, and is down-loaded from there to the NC device 10, such that the NC working operations are restarted.

By the way, as the probe $2b$ for effecting on-machine measurements, a displacement detection type is utilized when measurements including those with respect to the form of the work 4 are made. On the other hand, a position detection type probe is utilized when measurements are made only with respect to the dimensions of the work.

The on-machine measurements have the advantage that deviation detection type measurements (described hereinbelow) can be made, and that the number of measurement axes of the probe can be reduced by effecting measurements with a fixed axis.

Further, with respect to the measurement programming means $14c$ and its data processing, the NC instructions which are necessary for the on-machine measurements may be given by: (1) the method of utilizing an inputted program as in the case of CNC three-dimensional measurement machines; (2) the method by which, as in the case of a digitizer, one axis is fixed and a translation vector is given in the direction orthogonal to the normal (i.e., along the tangent) at the contact point of the probe sphere and the workpiece; and (3) the method by which the working (machining) program is slightly modified to obtain a program for measurements, (referred to herein as the deviation detection method).

The data processing for calculating and displaying the working error are somewhat different for the above three methods. Namely, in the case of the method (1) where a program input is utilized, it is hard to establish a general data processing method, and the data processing depends on respective programs. On the contrary, with respect to the methods (2) and (3), a general data processing method can be established. However, with respect to the method (2), since the form of work is not known beforehand, the automatization of the accurate form fitting and error display procedure is difficult to realize. With regard to the method (3), since the form of the work is known beforehand via the working or machining NC program, the automatization thereof is relatively easy.

As described above, the working form error of the workpiece and the amount yet to be worked from the workpiece can easily be obtained by means of the deviation detection method (3). Further, with regard to the automatic generation of the correction re-working program in the reworking programming means $14d$, although a correction reworking is impossible when the working form error exceeds the amount yet to be worked, otherwise, the workpiece having a target form and dimension can be obtained by adjusting the working program by the amount of error by means of an automatic calculation.

Figure 2:
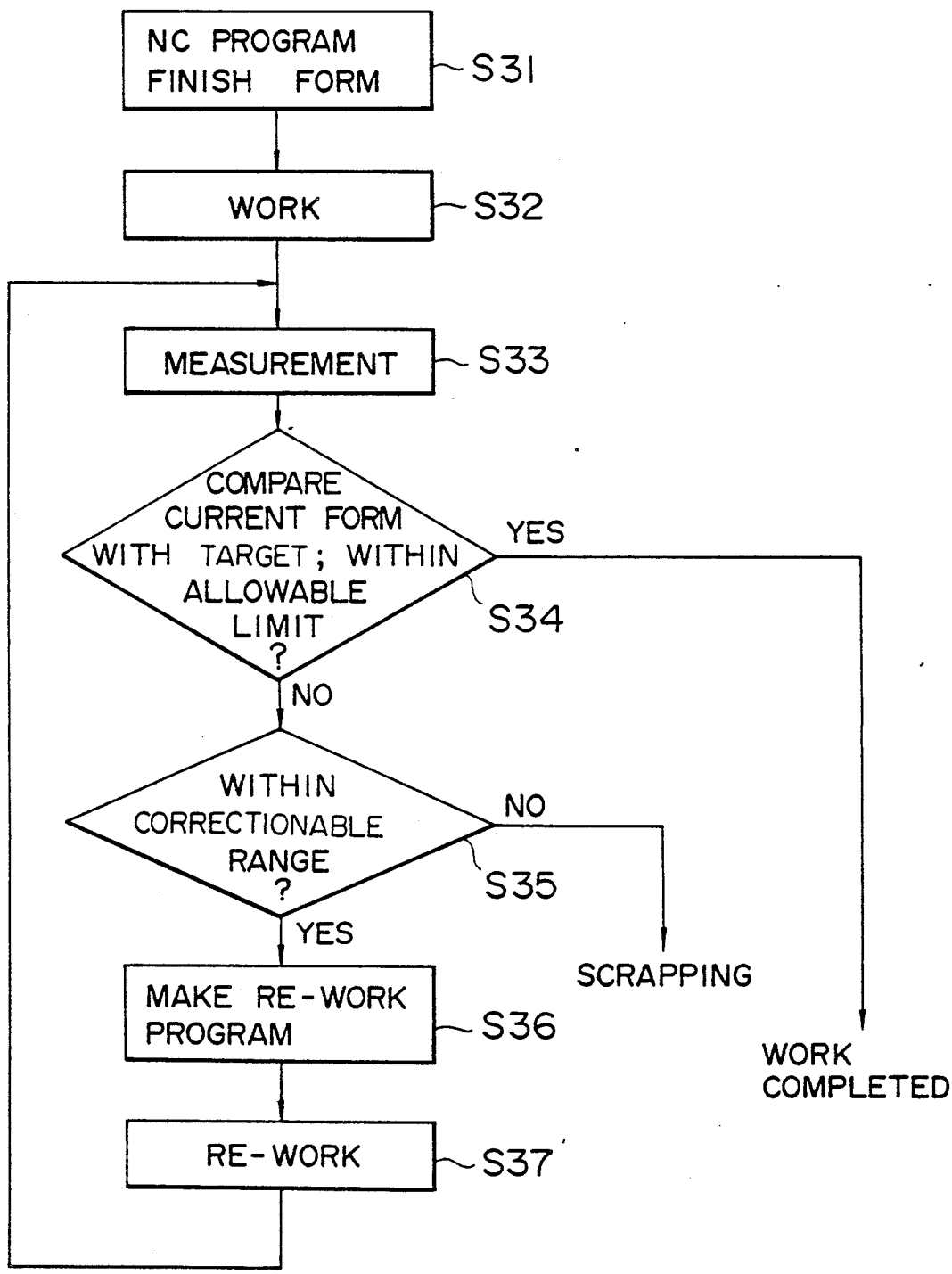
FIG. 2 is a flowchart showing the working and measurement procedure of the device of FIG. 1.

Next, the operation of the NC device is described referring to the flowchart of FIG. 2. At step 31, from a host computer 20 and an external programming device or an operation board, a working (machining) program and the target finished form and dimensions instructions with regard to the workpiece 4 are received. Further, processes such as the probe calibration, probe gain adjustment, and the determination of the probe sphere are completed, and the three-dimensional probe 2b is then replaced by a tool 2a1 through 2an by the ATC (automatic tool changer). The preparation for the working process, including the setting of the workpiece 4 is thus completed.

The above-mentioned calibration, gain adjustment, and the sphere diameter determination of the three-dimensional probe 2b is effected as follows:

(1) The calibration of the three-dimensional probe: First, the three-dimensional probe 2b is attached to the spindle 6, and the calibration programming means 14a is activated. Utilizing gauges having surfaces parallel to the X-, Y-, and Z-axes, respectively, parallel alignments with respect to the X-, Y-, and Z-axes are effected by means of adjustment screws of the probe 2b.

(2) The gain adjustment of the three-dimensional probe: Translating the machine table 5 at a translation step of about 1/20 part of the effective stroke of respective axes, the correction coefficients of the respective axes (the gains of the three-dimensional probe) are determined from the output of the probe 2b. The gains of the probe 2b are thus set in accordance therewith, such that accurate values of the displacements of the three-dimensional probe are transmitted to the NC device 10.

(3) The measurement of the sphere diameter of the three-dimensional probe: A master ball having a known diameter is placed on the machine table 5, and the three-dimensional probe sphere is moved in the X-Y plane of the master ball by an arc command. At the same time, the position of the machine table 5 and the displacement of the three-dimensional probe 2b are sampled at the interval of several tenths of the whole circumference of the master ball, and are taken in and stored in the NC device 10. Further, from these data, the average distance of the probe 2b from the center of the master ball is calculated, and by subtracting from this value the known radius of the master ball, the radius of the three-dimensional probe sphere is obtained.

Next, at step 32, in accordance with the command of the working program of the machine driving program 16, the workpiece 4 is worked (machined). When the working is over, the execution proceeds to the next step.

Figure 3:
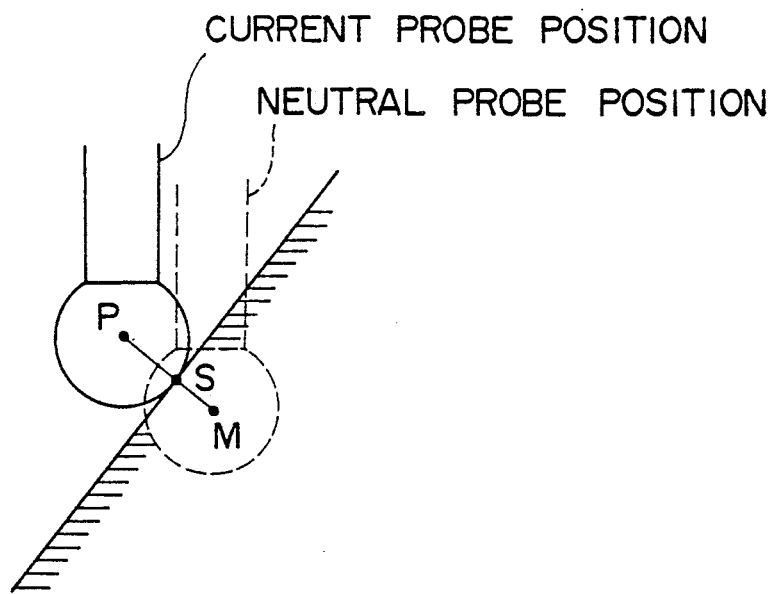
FIG. 3 is a schematic view showing the positional relationship between the work and the three-dimensional probe of the machine tool of FIG. 1.

At step 33, in accordance with the measurement program command of the machine driving program 16, the tool 2a1 through 2an is removed from the spindle 6 and the three-dimensional probe 2b is attached thereto by the ATC. Further, in this measurement program, the radius of the three-dimensional probe is taken into consideration. Thus, a radius correction is effected automatically with regard to the finished outer form program of the NC program 11, such that the probe sphere is pushed in onto the workpiece 4 by a proper amount. The probe sphere is thus moved along the contour of the workpiece 4 at a pre-designated measurement probe feed speed, and the command coordinate values ($X_{Ci}$, $Y_{Ci}$, $Z_{Ci}$), the position of the machine table ($X_{Mi}$, $Y_{Mi}$, $Z_{Mi}$), and the displacement of the three-dimensional probe ($X_{Di}$, $Y_{Di}$, $Z_{Di}$) are stored in the NC device 10 at a pre-designated sampling period. The relationship between the neutral position of the three-dimensional probe 2b, (the position of the machine table) M: ($X_{Mi}$, $Y_{Mi}$, $Z_{Mi}$), the current position of the three-dimensional probe 2b, P: ($X_{Pi}$, $Y_{Pi}$, $Z_{Pi}$), and the position of the contact point of the three-dimensional probe 2b and the workpiece 4, S: ($X_{Si}$, $Y_{Si}$, $Z_{Si}$) is shown in FIG. 3.

The coordinates of the position of contact S is calculated by:

$$(X_{Si}, Y_{Si}, Z_{Si}) = (X_{Mi}, Y_{Mi}, Z_{Mi}) + (X_{Di}, Y_{Di}, Z_{Di}) - (X_{Di} \cdot R/R', Y_{Di} \cdot R/R', Z_{Di} \cdot R/R')$$

where:

($X_{Di}$, $Y_{Di}$, $Z_{Di}$) is the displacement vector of the three-dimensional probe 2b;

R is the radius of the three-dimensional probe sphere; and

R' is the absolute value of displacement vector ($X_{Di}$, $Y_{Di}$, $Z_{Di}$), namely, $R' = \sqrt{X_{Di}^2 + Y_{Di}^2 + Z_{Di}^2}$. On the other hand, the working error ($\Delta X_i$, $\Delta Y_i$, $\Delta Z_i$) is given by:

$$(\Delta X_i, \Delta Y_i, \Delta Z_i) = (X_{Ci}, Y_{Ci}, Z_{Ci}) - (X_{Si}, Y_{Si}, Z_{Si}).$$

The data at respective sampling time points are stored in the memory within the working error calculation program 17. By the way, when the neutral position of the three-dimensional probe 2b is given by a command as the work form coordinates, the working error ($\Delta X_i$, $\Delta Y_i$, $\Delta Z_i$) can be calculated by:

$$(\Delta X_i, \Delta Y_i, \Delta Z_i) = - (X_{Di}, Y_{Di}, Z_{Di}) +$$

$$(X_{Di} \cdot R/R', Y_{Di} \cdot R/R', Z_{Di} \cdot R/R')$$

since $$(X_{Ci}, Y_{Ci}, Z_{Ci}) = (X_{Mi}, Y_{Mi}, Z_{Mi})$$

holds in the case of the machine tool by which the machine table is controlled with sufficient precision.

Next, at step 34, the above working errors are compared with the predetermined tolerances $\epsilon X$, $\epsilon Y$, and $\epsilon Z$. If they satisfy the conditions (a):

$$\left. \begin{array}{l} |\Delta X_i| \leq \epsilon X \\ |\Delta Y_i| \leq \epsilon Y \\ |\Delta Z_i| \leq \epsilon Z \end{array} \right\} \quad (a)$$

the re-working for correction is not necessary, and the working is complete. By the way, the tolerances $\epsilon X$, $\epsilon Y$, and $\epsilon Z$ are assumed positive, and possibly they are equal: $\epsilon X = \epsilon Y = \epsilon Z$.

When the above conditions (a) do not hold, the execution proceeds to the step S35, where judgment is made whether the error is within the correctionable range. When only the dimensional errors are present, the judgment is effected at step S35 as follows. In the case of interior working, if at least one of the conditions (b) is satisfied:

$$\left.\begin{array}{l}\Delta Xi > \epsilon X \\ \Delta Yi > \epsilon Y \\ \Delta Zi > \epsilon Z\end{array}\right\} \quad (b)$$

or, in the case of exterior working, if at least one of the conditions (c) is satisfied;

$$\left.\begin{array}{l}\Delta Xi < \epsilon X \\ \Delta Yi < \epsilon Y \\ \Delta Zi < \epsilon Z\end{array}\right\} \quad (c)$$

then, the work is incapable of correction and thus is scrapped.

On the other hand, if, in the case of interior working, the conditions (d) are satisfied:

$$\left.\begin{array}{l}\Delta Xi \leq \epsilon X \\ \Delta Yi \leq \epsilon Y \\ \Delta Zi \leq \epsilon Z\end{array}\right\} \quad (d)$$

or, if, in the case of exterior working, the conditions (e) are satisfied:

$$\left.\begin{array}{l}\Delta Xi \geq \epsilon X \\ \Delta Yi \geq \epsilon Y \\ \Delta Zi \geq \epsilon Z\end{array}\right\} \quad (e)$$

then, the work 4 is capable of correction. Thus, the execution proceeds to the next step S36.

At step S36, the re-working program is corrected such that the working errors $\Delta Xi$, $\Delta Yi$, and $\Delta Zi$ will be reduced to within the predetermined tolerances. Further, at the next re-working step S37, the three-dimensional probe 2b is removed from the spindle 6 and the orignial tool 2a1 through 2an is attached again to effect the re-working. When a tool different from that used originally is utilized in the re-working, corrections are made taking into consideration the dimensions of the tools.

When the re-working at step 37 is finished, the execution returns to the measurement at step S33, so as to repeat the procedure at steps S33 through S37. The program is terminated when the workpiece is judged a non-defective article at step S34, or when the work is judged a non-correctable defective article at step S35. As described above, according to the deviation detection method, the work form (shape) errors and the amounts yet to be worked can be obtained easily. Next, this working/measurement procedure is described in detail by reference to a simple exemplary working-/measurement procedure. With regard to the procedure, the following points may be noted in summary:

(A) The method of calculating the working errors for respective worked figures and portions:

The working errors consist of: (1) dimensional errors, (2) errors of the positions of the worked portions, and (3) errors of the forms of the worked portions. The dimensional errors (1) refers to errors of dimensions of the worked portions which are accurate in positions and forms. The positional errors (2) refers to errors of (translational and rotational) positions of the worked portions which are accurate in form and dimensions. The form errors (3) refer to errors of form of the worked portions which are accurate in position and dimensions. The form errors include: straightness errors (generated in a line interporation procedure G01), circularity errors (generated in an arc interpolation procedure G02 and G03), and the contour errors (generated at the worked portions defined by means of a series of points). The measurement data are analysed under the above categories, and the working errors are calculated with respect to each working form and portion.

(B) The necessity of correction re-working and the method of judgment of the defective article. The tolerances for each worked figure and portion are compared with the magnitudes of the errors calculated by the working error calculation method (A) with respect to each worked figure and portion. When an error incapable of correction (e.g., the excess of the hole diameter) is present, the work is judged defective. When all the errors are within the tolerance, the work is conforming, and the working is terminated. When there is a worked portion which is in need of correction re-working and which is indeed capable of correction, the kinds and the magnitudes of the errors are registered in a file with respect to respective worked portions.

(C) The method of determining the re-working tool and condition. With respect to the worked form and portion that are to be re-worked, taking into consideration the amount of necessary re-working, the magnitudes of the allowable errors, and the roughness of the finished surfaces, candidate tools appropriate for the working are selected from the tools (e.g., end mill 10 mm diameter, internal grinder 8 mm diameter, reamer 7 mm diameter, for each of which the roughness of the finished surface, the limit depth of cut, and the relation between the nominal or rated depth of cut and the actual amount of removal or depth of cut are registered beforehand).

Next, from among the candidate tools, the tool that is to be utilized is determined taking into consideration the working cost, and then the working conditions for the tool, such as the nominal depth of cut, the working speed, and the feeding speed, are determined.

(D) The method of preparing and generating the re-working program. On the basis of the working program executed immediately before the measurements, a correction re-working program is prepared which satisfies, with respect to each worked form and portion in need of re-working, the working condition as determined by the determination method (C) for determining the re-working tool and condition.

EXEMPLARY WORKING/MEASUREMENT PROCEDURE

Figure 4:
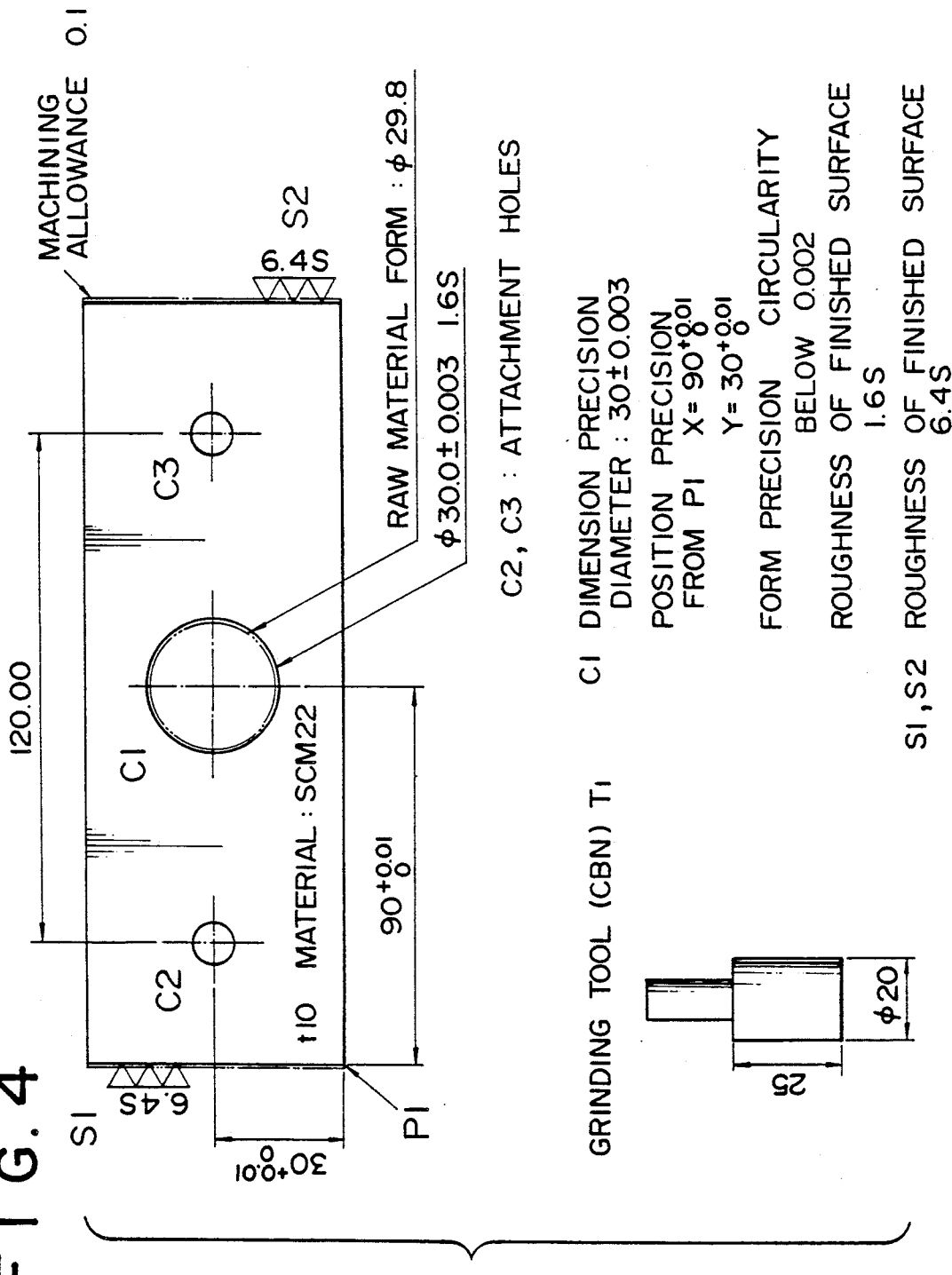
FIG. 4 shows the details of an example of the work together with a tool.

Next, a simple exemplary working/measurement procedure is described where a work (a machine part) as shown in FIG. 4 is worked according to this invention. FIG. 4 shows the target finished form and the raw material form before working, together with the tool used in the working. The working program is shown in the following TABLE 1:

TABLE 1

| WORKING PROGRAM |
|---|
| P 01234 (MAIN) |
| G28X0.Y0.Z0.; |
| G0 G40 G80; |
| T10; |
| M6 ; |

TABLE 1-continued

WORKING PROGRAM

| | |
|---|---|
| N1 | #140 = 14.9; |
| N2 | #141 = 0.03; (0.02) |
| N3 | #145 = 3; (4) |
| | #146 = 0; |
| N4 | G0G90G54X0.Y0.; C1 ROUGH WORKING |
| N5 | G43Z50. H1S5000M3; |
| N6 | Z - 15. M7; |
| N7 | G13I[#140 + #141]D40F200; |
| N8 | #145 = #145 - 1; |
| N9 | IF[#145LE#146]GOTO 12; |
| N10 | #140 = #140 + #141; |
| N11 | GOTO 7; |
| N12 | M5; |
| | M9; |
| N13 | G0Z50.; |
| N14 | M00; |
| | G0G90G54X0.Y0.; |
| | G43Z50.H2S5000M3; |
| | Z - 15.M7; |
| | G1G41Y5.Y - 10.D40F200; C1 FINISH WORK |
| | G3X15.Y0.R10.M34F100; |
| | I15.; (TOOL DIAMETER 20.000) |
| | X5.Y10.R10.; |
| | G1G40X0.Y0.F1000; |
| | G0Z65M5M9; |
| | G0G54X - 95.Y - 50.; |
| | G43Z50.H1S5000M3M7; |
| | D40; |
| | M98P1235; |
| | X - 95.Y - 50.; |
| | D41; |
| | M98P1235; S1.S2 SIDE SURFACES ROUGH WORKING |
| | X - 95,Y - 50.; |
| | D42; |
| | M98P1235; |
| | X - 95.Y - 50.; |
| | D43; |
| | M98P1235; |
| | M5M9; |
| | G28X0.Y0.Z0.; |
| | T20; |
| | M6; |
| | G0G54X - 95.Y - 50.Z50.; |
| | G1Z - 15.S5000M3M7F1000; |
| | G41X - 90.F100M34; S1, S2 SIDE SURFACES FINISH WORKING |
| | Y35. |
| | X90.F2000; |
| | Y - 35.F100; |
| | M35G40; |
| | G0Z50.M5M9; |
| | G28X0.Y0.Z0.; |
| | M30; |
| P 1235 | (SUB) |
| | G0G90Z5.M7; |
| | G1Z - 15.F1000; |
| | G41X - 90.08F200; |
| | Y35. |
| | X90.08F2000; |
| | Y - 35.F2000; |
| | X - 100.F2000; |
| | G0G40Z50.; |
| | M99; |

The working and measurements of the work are effected as follows:

(A) First Working G1:

Utilizing the working program of TABLE 1, a predetermined grinding tool T1 is taken out from the tools magazine and attached to the spindle 6 by the ATC, and the grinding of the side surfaces S1 and S2 and the grinding of interior surface C1 are effected.

(B) First Measurement M1;

The working program is converted to a measurement program for the purpose of measuring the working errors and the finished surface roughness of the side surfaces S1 and S2 and the interior surface C1 which have undergone the grinding process. A three-dimensional probe 2b is taken out of the tool magazine and attached to the spindle 6 by the ATC, and the measurements are effected. The following TABLE 2 shows an example of the results of the measurements.

TABLE 2

THE WORKING FORM ERROR AND THE ROUGHNESS OF THE FINISHED SURFACES AS OBTAINED BY THE MEASUREMENT M1
(the values within the parentheses show the allowable values)

Side surface S1; roughness of the finished surface
5.0 μmRmax (6.4 S)
Side surface S2: roughness of the finished surface
5.5 μmRmax (6.4 S)
Interior Circle C1:

dimensional precision
diameter: 29.994 mm (29.997~30.003 mm)
positional precision
from P1: X = 90.005 mm (90.000~90.010 mm)
Y = 30.065 mm (30.000~30.010 mm)
form precision
circularity: 4.0 μm (2 μm)
roughness of
the finished surface: 2.5 μmRmax (1.6 S)

By comparing the current form of the work with the target finished form, the following results are obtained:

(1) With regard to the side surface S1:

The roughness of the finished surface is 5.0 μmRmax, and thus satisfies the condition: 6.4S.

(2) With regard to the side surface S2:

The roughness of the finished surface is 5.5 μmRmax, and thus satisfies the condition: 6.4S.

(3) With regard to the interior circle C1:

(3-1) The average diameter is 29.994 mm, which is smaller than the allowable range 29.997~30.003 mm by 0.003 mm (3 μm).

(3-2) The position of the center of the circle C1 is: X=90.005 mm, Y=30.006 mm, which is within the allowable ranges: X=90.000~90.010, Y=30.000~30.010.

(3-3) The circularity error of C1 is 4.0 μm, which is greater than the allowable value 3 μm by 1 μm.

(3-4) The current roughness of the finished surface is 2.5 μmRmax, which satisfies the condition: 1.6 S.

In summary, it can be concluded that the re-workings are required with respect to (3-1), (3-3) and (3-4) for the interior circle C1.

(C) The preparation of the re-working program P1:

Currently, the tools which are provided in the tools magazine are the two tools T1 and T2, with respect to which the following technical information is registered:

With respect to tool T1:

diameter: 20.000 mm;
length: 25.050 mm;
abrasive grain: CBN#140;
grinding speed: 1600~2000 m/min;
feeding speed: 50~300 mm/min;
limit depth of cut: 0.002 mm (2 μm);
maximum depth of cut: 20 μm;
roughness of finished surface: 3.2 S With respect to tool T2:

diameter: 15.000 mm;
length: 20.080 mm;
abrasive grain: CBN#300;
grinding speed: 1600~2000 m/min;
feeding speed: 40~250 mm/min;
limit depth of cut: 0.0015 mm (1.5 μm);
meximum depth of cut: 15 μm;

roughness of finished surface: 1.6 S

Figure 5:
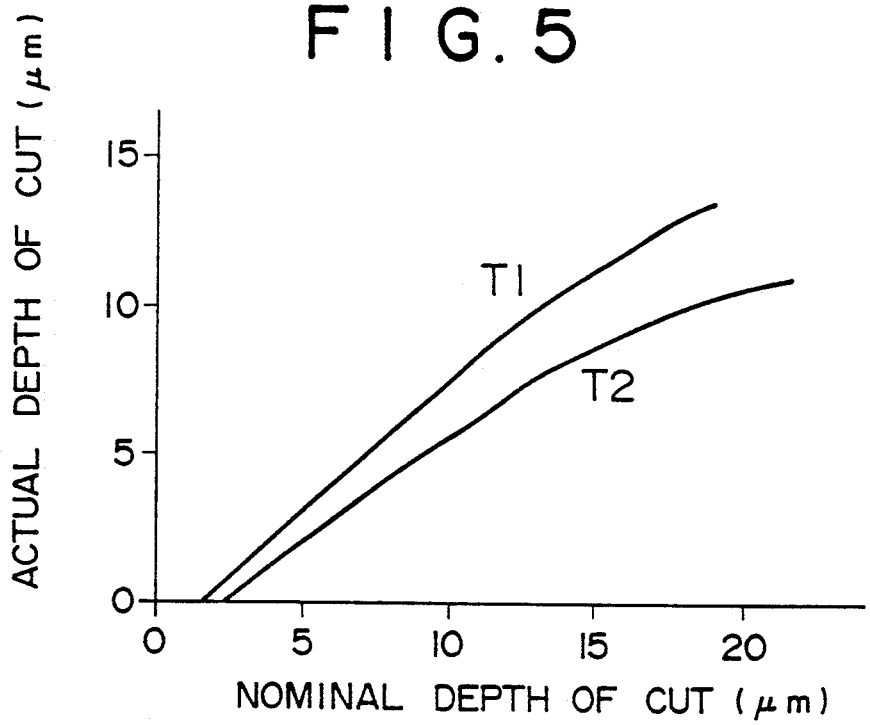
FIG. 5 shows the relations between the nominal and actual depth of cut.

With respect to the two tools T1 and T2, the relations between the nominal or rated depth of cut and the actual depth of cut are obtained as shown in FIG. 5.

Figure 6:
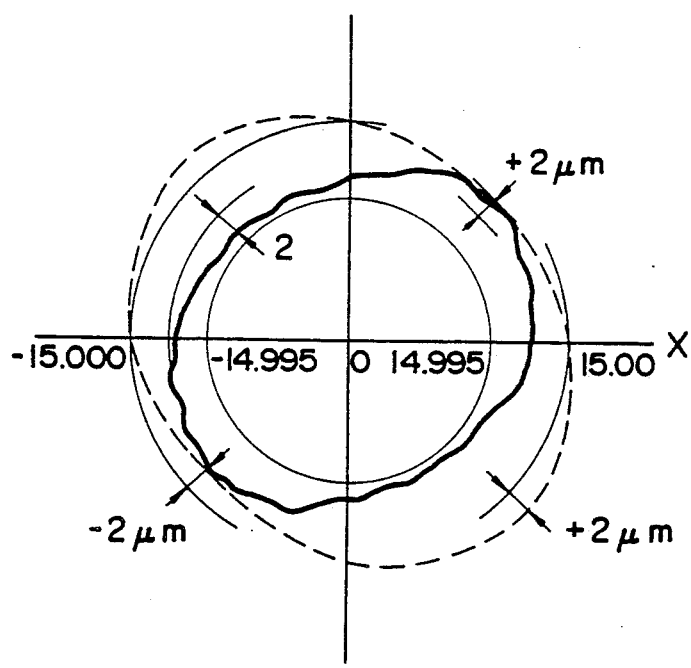
FIG. 6 is a diagram for explaining the re-working procedure of the work shown in FIG. 4.

In order to satisfy the roughness of the finished surface 1.6 S required for the interior circle C1, the tool T2 is selected, and the working conditions are determined as follows: grinding speed: 1800 m/min; the feeding speed 100 mm/min; the nominal depth of cut: 8μm. Further, for the purpose of correcting the circularity error, the tool path has been modified as shown in the dotted curve in FIG. 6. The modification has been done by means of the error correction or adjustment program, since the error is not so great as to require the modification of the input program. Via the above process, the correction re-working program as shown in TABLE 3 has been prepared.

TABLE 3
CORRECTION WORKING PROGRAM

G28X0.Y0.Z0.;
T20;
M6;
G0G90G54X0.Y0.;
G43Z50.H2S30000M3;
Z - 15.M7;
G1G41X5.Y - 10.D40F200;
G3X15.Y0.R12.5M34F60;
I15.0;    (TOOL DIAMETER 14.99)
X5.Y10.R12.5;
G1G40X0.Y0.F1000;
G0Z65.M5M9;

(D) Correction Re-Working G2:

According to the correction working program shown in TABLE 3, the tool T2 is taken out of the tools magazine and attached to the spindle 6 by the ATC, and the grinding of the interior surface C1 is effected.

(E) Second Measurement M2:

For the purpose of measuring the working error and the roughness of the finished surface of the interior circle C1 which has undergone the correction grinding process, the working program is converted to a measurement program. By means of the ATC, the three dimensional probe 2b is taken out from the tools magazine and attached to the spindle 6, and the measurement are effected. The following TABLE 4 shows an example of the results of the measurements.

TABLE 4
THE WORKING FORM ERROR AND THE ROUGHNESS
OF THE FINISHED SURFACES AS OBTAINED
BY THE MEASUREMENT M2
(the values within the parentheses show the allowable values)

Interior Circle C1:

dimensional precision
diameter: 29.999 mm (29.997~30.003 mm)
form precision
circularity: 1.5 μm (2 μm)
roughness of
the finished surface: 1.3 μmRmax (1.6 S)

By comparing the current and the target forms, the following results are obtained with regard to the interior circle C1:

(1) The average diameter is 29.999 mm, which is within the allowable range 29.997~30.003 mm.

(2) The circularity error is 1.5 μm, which is smaller than the allowable value 2 μm.

(3) The current roughness of the finished surface is 1.3 μmRax, which satisfies the condition: 1.6 S.

Thus, all the working conditions for the work are satisfied and the working is terminated.

In the above embodiment, three- and two-dimensional workings and measurements are effected. In the two-dimensional case, if the rotational angle of the spindle is controlled by the NC device such that the end of the measurement probe is always directed normal to (i.e., at right angles with) the measurement path, an inexpensive one-dimensional probe may be utilized as the measurement probe and the amount of measurement data can be reduced, the necessary calculation thereby being reduced.

What is claimed is:

1. A numerical control device for a machine tool including working means for machining a workpiece to a target form and dimensions, and measurement means for effecting on-machine measurements of the machined workpiece without changing a position of the workpiece on the machine tool, said numerical control device comprising:

measurement programming means for generating a measurement program for controlling a measurement procedure of said measurement means;

working error calculation means, connected to an output of said measurement means, for determining a working error of form and dimensions as measured by said measurement means with respect to a target form and dimensions as provided by said numerical control device to said machine tool, said working error calculation means judging whether said working error is within a tolerance range or not, and when said working error is judged outside of the tolerance range, whether the working eror is such that a correction re-working of the workpiece is possible or not; and correction re-working programming means for generating a correction re-working program when said working error is outside of the tolerance range and a correction re-working of the workpiece is judged possible, said correction re-working program controlling said working means in a re-working procedure by which the form and dimensions of the workpiece are corrected to the target form and dimensions.

2. A numerical control device as claimed in claim 1, wherein: said measurement means of the machine tool comprises a probe; said measurement program controls a relative movement of the probe with respect to the workpiece positioned on the machine tool such that the probe moves along a worked portion of the workpiece with a displacement from a neutral position of the probe; and said working error calculation means determines the working error from said displacement of the probe from the neutral position thereof.

3. A numerical control device as claimed in claim 2, wherein said working error calculation means samples the displacement of the probe at a predetermined sampling period.

* * * * *

UNITED STATES PATENT AND TRADEMARK OFFICE
CERTIFICATE OF CORRECTION

PATENT NO. : 5,117,169
DATED : May 26, 1992
INVENTOR(S) : Yoshiaki Kakino et al.

It is certified that error appears in the above-identified patent and that said Letters Patent is hereby corrected as shown below:

On the cover page [57] abstract, line 3, "work" should be --workpiece--.

On the cover page [57] abstract, line 3, "the" should be --a--.

On the cover page [57] abstract, line 14, delete "correctable, a".

On the cover page [57] abstract, line 15, after "and" insert --correctable, a--.

Col. 1, line 45, "impractical" should be --impracticable--.

Col. 2, line 16, "align-" should be --re-align- --.

Col. 9, line 51, "Y - 35.F2000;" should be --Y - 35.F200;--.

Signed and Sealed this

Seventeenth Day of May, 1994

Attest:

BRUCE LEHMAN

*Attesting Officer*      *Commissioner of Patents and Trademarks*